(12) United States Patent
Korpela et al.

(10) Patent No.: US 12,158,749 B2
(45) Date of Patent: *Dec. 3, 2024

(54) AUTOMATED COMPONENT SOURCING BASED ON PROCESS SYSTEM DESIGN

(71) Applicant: Rockwell Automation Technologies, Inc., Mayfield Heights, OH (US)

(72) Inventors: Jessica L. Korpela, Milwaukee, WI (US); Barry M. Jereb, Chargin Falls, OH (US); Jeffrey L. Kibbey, Oconomowoc, WI (US); David Lillie, Waterford, WI (US); Lisa J. Smith, Port Washington, WI (US); Eric Rehl, Oak Creek, WI (US); Amit R. Sathe, Mayfield Heights, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/453,537

(22) Filed: Aug. 22, 2023

(65) Prior Publication Data

US 2023/0393565 A1 Dec. 7, 2023

Related U.S. Application Data

(63) Continuation of application No. 17/697,204, filed on Mar. 17, 2022, now Pat. No. 11,782,423, which is a (Continued)

(51) Int. Cl.
*G05B 19/418* (2006.01)
(52) U.S. Cl.
CPC .............. *G05B 19/41865* (2013.01); *G05B 2219/31376* (2013.01)

(58) Field of Classification Search
CPC ............... G05B 19/41865; G05B 2219/31376
See application file for complete search history.

(56) References Cited

U.S. PATENT DOCUMENTS 9,971,338 B1   5/2018   McAlvay et al.
11,281,192 B2 *  3/2022   Korpela .......... G05B 19/41845
(Continued)

FOREIGN PATENT DOCUMENTS

CN   105527868 A   4/2016
GB   2495874 A   2/2013
(Continued)

OTHER PUBLICATIONS

Chinese Office Action for CN Application No. 202010877799.8, mailed Jan. 2, 2024; 16 pages; with English translation.
(Continued)

*Primary Examiner* — Gary Collins (57) ABSTRACT

The technology disclosed herein enables automation of component sourcing when designing a process system in an industrial environment. In a particular embodiment, a method includes receiving design specifications of a process system in an industrial environment via a system design application. The method further includes determining components to implement the process system from the design specifications and identifying a first subset of the components for sourcing from an external provider. The method also includes populating the first subset into a component sourcing application.

20 Claims, 7 Drawing Sheets

Related U.S. Application Data continuation of application No. 16/586,117, filed on Sep. 27, 2019, now Pat. No. 11,281,192.

(56) References Cited

U.S. PATENT DOCUMENTS

| | | |
|---|---|---|
| 2002/0023046 A1 | 2/2002 | Callahan et al. |
| 2002/0165805 A1 | 11/2002 | Varga et al. |
| 2005/0065903 A1 | 3/2005 | Zhang et al. |
| 2006/0026193 A1 | 2/2006 | Hood |
| 2011/0320175 A1 | 12/2011 | Perry et al. |
| 2014/0129822 A1 | 5/2014 | Weatherhead et al. |
| 2014/0137069 A1 | 5/2014 | Duff et al. |
| 2016/0132047 A1 | 5/2016 | Kambe et al. |

FOREIGN PATENT DOCUMENTS

| | | | | |
|---|---|---|---|---|
| JP | 2005518615 A | 6/2005 | | |
| WO | WO-03079139 A2 * | 9/2003 | ............ | G06F 17/40 |

OTHER PUBLICATIONS

European Search Report for EP Application 20188120, dated Feb. 2, 2021; 12 pages.

* cited by examiner

AUTOMATED COMPONENT SOURCING BASED ON PROCESS SYSTEM DESIGN

RELATED APPLICATIONS

This application is a continuation of and claims the benefit of and priority to U.S. patent application Ser. No. 17/697,204 titled "AUTOMATED COMPONENT SOURCING BASED ON PROCESS SYSTEMS DESIGN," filed on Mar. 17, 2022, which is a continuation of and claims the benefit of and priority to U.S. patent application Ser. No. 16/586,117, titled "AUTOMATED COMPONENT SOURCING BASED ON PROCESS SYSTEMS DESIGN," filed on Sep. 27, 2019, issued as U.S. Pat. No. 11,281,192 on Mar. 22, 2022, each of which are hereby incorporated by reference in their entirety for all purposes.

TECHNICAL BACKGROUND

Process systems in industrial environments are made up of various components that work together to achieve an end result for a process. For example, a process system may be at least partially automated and configured to manufacture a product or a component of a product, although other types of process systems exist. To achieve a desired end result for a particular process system, a designer of the process system determines which components, and possibly a number of those components, should be used to implement the process system. The components may include motors, nozzles, belts, mechanical arms, gear boxes, computer implemented control systems, or any other type of component that may be useful for performing a process in an industrial environment. Those components are installed in the industrial environment to implement the designed process system.

Computer software programs now exist to assist a process system designer when they are designing a process system. For example, a process system design application may provide a "canvas" representing an area of a facility and allow a designer to easily place, move, remove, etc. various components on that canvas. The application may further provide additional features meant to assist the designer. For example, the application may allow the designer to connect, or attempt to connect, two placed components together and then indicate to the designer whether the two components are compatible. While the application may assist the designer when designing the process system, the designer, or other user tasked with implementing the designed process system, must then obtain and install the components specified by the design.

Overview

The technology disclosed herein enables automation of component sourcing when designing a process system in an industrial environment. In a particular embodiment, a method includes receiving design specifications of a process system in an industrial environment via a system design application. The method further includes determining components to implement the process system from the design specifications and identifying a first subset of the components for sourcing from an external provider. The method also includes populating the first subset into a component sourcing application.

In some embodiments, the method includes determining a second subset of the components that comprise components with configurable options and populating the second subset into a system configuration application. In those embodiments, the method may include presenting, via a system management platform, a dashboard view associated with the process system and, in the dashboard view, providing a user with options to execute the system design application, the system configuration application, and a component sourcing application.

In some embodiments, the design specifications are included in a first file accessible by the system design application and populating the first subset into the component sourcing application includes storing information about the first subset into a second file accessible by the component sourcing application.

In some embodiments, the design specifications are included in a first file accessible by the system design application and populating the first subset into the component sourcing application includes, in a system management platform, accessing the first file and translating information about the first subset in the design specifications to a second file accessible by the component sourcing application.

In some embodiments, the design specifications are included in a first file accessible by the system design application and the component sourcing application and populating the first subset into the component sourcing application includes, in the component sourcing application, obtaining first information about the first subset from the first file and adding second information about the first subset to the first file. In those embodiments, the first file may be accessible by a system configuration application, and the method may further include, in the system configuration application, obtaining third information about a second subset of the components that comprise components with configurable options and adding fourth information about the second subset to the first file. Also, in those embodiments, the first file being accessible by the system design application, the component sourcing application, and the system configuration application may include, in a system management platform, translating information in a first format of the first file to respective second formats understood by the system design application, the component sourcing application, and the system configuration application. Further in those embodiments, the method may include, after adding the second information, the system design application accessing the first file and ignoring the second information.

In some embodiments, identifying the first subset includes identifying a fifth subset of the components that do not need to be sourced and including components other than the fifth subset in the first subset.

In another embodiment, an apparatus is provided having one or more computer readable storage media and a processing system operatively coupled with the one or more computer readable storage media. Program instructions stored on the one or more computer readable storage media, when read and executed by the processing system, direct the processing system to receive design specifications of a process system in an industrial environment via a system design application. The program instructions further direct the processing system to determine components to implement the process system from the design specifications and identify a first subset of the components for sourcing from an external provider. The program instructions also direct the processing system to populate the first subset into a component sourcing application.

DETAILED DESCRIPTION

Once a process system has been designed for an industrial environment, the components specified in the design of that process system need to be obtained to implement the process system. The components may be obtained from a source external to the industrial environment, such as a manufacturer/supplier of the respective components or some other third party, or the components may be obtained from an inventory internal to the industrial environment. Components may be in the inventory of the industrial environment because they were already obtained from an outside source for other purposes, such as replacement components for another process system, components that were originally intended for a different process system, or are found in the inventory for some other reason—including combinations thereof. It is typically more cost effective and efficient for the industrial environment to use components already in inventory rather than having to source the components from a third party.

The examples described below automatically determine whether one or more components for a designed process system are already located in an inventory for an industrial environment. Components that are determined to already be located in the inventory likely do not need to be sourced from outside the industrial environment (e.g., from a manufacturer/supplier). Components that are not already located in the inventory are automatically added to a sourcing application that at least tracks components that need to be sourced from a third party (e.g., manufacturer/supplier). The sourcing application may further be configured to order the components tracked therein either automatically or upon receiving an instruction to do so from a user. Regardless, rather than relying on a user to perform an inventory search to more cost effectively and/or efficiently implement a designed process system, the examples herein automatically check with the inventory before populating components for sourcing into a sourcing application.

Figure 1:
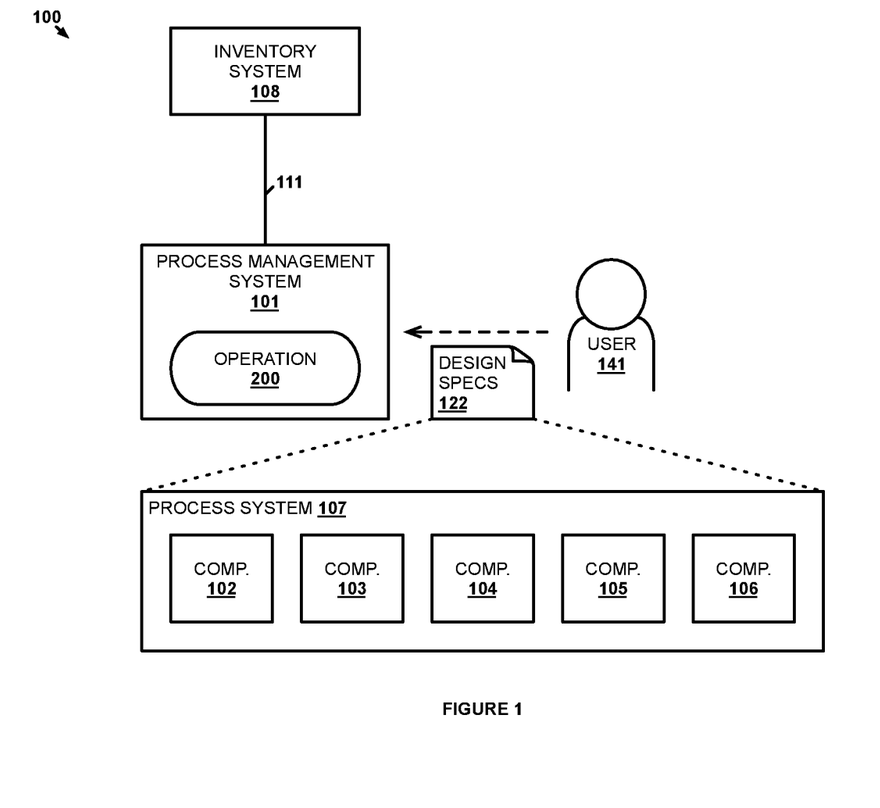
FIG. 1 illustrates an industrial environment for automating component sourcing based on the design of a process system.

FIG. 1 illustrates industrial environment 100 for automating inventory management based on the design of a process system. Industrial environment 100 includes process management system 101 and inventory system 108. As described below, process management system 101 performs operation 200 to automatically populate a component sourcing application with components that are not available in an inventory of industrial environment 100 to implement process system 107, which is defined by process design specifications 122. Process management system 101 and inventory system 108 communicate over communication link 111. Communication link 111 may be a direct wired or wireless link or may include intervening systems, networks, and/or devices. While shown as separate elements, process management system 101 and inventory system 108 may be combined into a single system or device. Likewise, while shown as individual devices, either or both of process management system 101 and inventory system 108 may be distributed across multiple devices.

Figure 2:
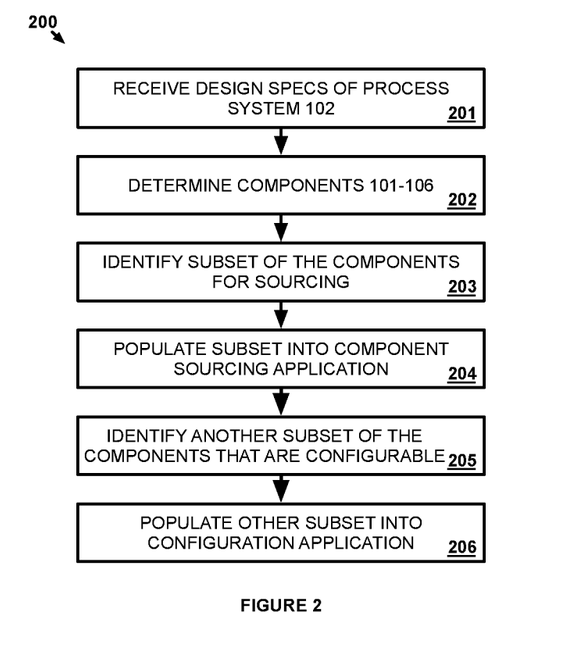
FIG. 2 illustrates an operation for automating component sourcing based on the design of a process system.

FIG. 2 illustrates operation 200 for automating inventory management based on the design of a process system. During operation 200, process management system 101 receives process design specifications 122 for process system 107 via a system design application (201). The system design application may be executing on process management system 101 or may be executing on a user system, such as a personal computer workstation, laptop, tablet, or smartphone of user 141. Process management system 101 may receive process design specifications 122 via user input received directly from user 141 into a user interface of process management system 101 or may receive process design specifications 122 over a communication link with a user system of user 141. In some examples, the system design application may be an application configured to automatically design a process system upon receiving parameters (e.g., a desired result from various input materials) for the system from user 141.

In this example, process system 107 that is specified by process design specifications 122 includes five components 102-106. Other examples may include more or fewer components than those of process system 107. Process design specifications 122 may be received once the design of process system 107 is completed or may be received in stages (e.g., each time a new component is added to process system 107 via the system design application). In examples of the latter, each stage of process design specifications 122 may trigger the performance of the remaining steps of operation 200 for the received stage rather than process management system 101 waiting until completed process design specifications 122 are received.

From process design specifications 122, process management system 101 determines components therein to implement process system 107 (202). In this example, process management system 101 determines that components 102-106 are specified in process design specifications 122. In this example, components 102-106 are components of process system 107 that can be sourced from a third party (e.g., offered for purchase by a manufacturer/supplier), specifically those that can be sourced using a component sourcing application described herein. Though not shown, process system 107 may include other components that cannot be sourced (e.g., may be proprietary for the industrial environment). In one example, process management system 101 may be able to assume that all components specified in process design specifications 122 are those that can be sourced. In another example, process management system 101 may identify components 102-106 by determining that components 102-106 are specified in process design specifications 122 based on a unique identifier for each respective one of components 102-106 (e.g., the components' respective part numbers and, if necessary, manufacturers). In some examples, certain ones of components 102-106 may not be explicitly included in process design specifications 122 and process management system 101 may infer such a component. For instance, process management system 101 may determine that component 103 needs a mount for implementation in process system 107 and identifies component 104 as being that mount. Other manners of determining components 102-106 may also be used.

From components 102-106, process management system 101 identifies a subset of the components for sourcing from a provider external to industrial environment 100 (203). The external provider may be a third-party manufacturer or supplier of respective ones of components 102-106. In one example, process management system 101 queries inventory system 108 for information about whether any of components 102-106 are in an inventory of industrial environment 100. Inventory system 108 tracks the inventory status of components in industrial environment 100 (e.g., receives inventory information from one or more users, automatically updates inventory information from shipping receipts, or obtains inventory information updates in some other manner). For example, inventory system 108 may store and maintain a database that lists a number of individual components that are available in industrial environment 100 (e.g., that there are 4 components of particular part number in inventory). Inventory system 108 may further track a location of the components in inventory, such as a facility (e.g., factory building) or room in the facility where each component is located. Based on the inventory information provided by inventory system 108, process management system 101 may determine which of components 102-106 should be included in the subset. In some examples, process management system 101 determines that a component located in inventory does not need to be sources because the component can be taken from inventory. In other examples, additional criteria may need to be met in order to include a component in the subset. For example, there may be three of component 104 in inventory but at least three, or some other threshold number in other examples, may be required as spares before ordering more. In that example, process management system 101 would still determine to include component 104 in the subset to not reduce the amount of component 104 in inventory below three. Similarly, another criterion may indicate that an inventory component may need to be located within a certain distance of where process system 107 will be implemented. In those examples, if an inventory component is located at a facility that is too far away, then the component will be included in the subset. Other criteria defining whether an inventory component should be used rather than sourcing a component from an external provider may also be used.

Process management system 101 then populates the identified subset into a component sourcing application (204). For instance, if process management system 101 determined that component 102, component 103, and component 105 are in the subset, then process management system 101 passes information describing component 102, component 103, and component 105 to the component sourcing application so that component 102, component 103, and component 105 are populated therein. In some examples, the component sourcing application is executing on process management system 101 while, in other examples, the component sourcing application is executing on another computing system in communication with process management system 101, such as a user system operated by user 141. The component sourcing application may supply an Application Programming Interface (API) that process management system 101 uses to pass information defining the subset to the component sourcing application for population therein. In another example, process management system 101 may store information identifying the components in the subset to a file accessible by the component sourcing application (e.g., in a format defined by the component sourcing application or some other type of format that the component sourcing application is capable of accessing). The component sourcing application may then read the component information from the file. Other manners of passing information between computer software elements may also be used. Once the subset has been populated into the component sourcing application, the component sourcing application may be operated by user 141 to present user 141 with the subset of components 102-106 that should be sourced and may be able to initiate the sourcing of at least a portion of those components (e.g., may be able to communicate with an ordering system operated by a manufacturer/supplier to order the components).

In some examples, operation 200 may stop once the subset of the components has been populated in the component sourcing application. In other examples, process management system 101 may also determine a second subset of components 102-106 that includes components with configurable options (205). Components that have configurable options comprise components with computing circuitry that control physical operation of at least a portion of process system 107. That computing circuitry can be configured to operate to achieve the desired output of process system 107. For example, a control system component for a mechanical grab arm may have options that configure how much pressure should be used to grab an item, how fast the item should be moved, where the item should be placed, or some other type option that corresponds to a variable parameter of the arm. Other types of components will have other types of options available to them.

A system configuration application is used in this example to define the desired options for operation of process system 107. Process management system 101 populates the second subset into the system configuration application (206). The system configuration application may know the options for components of process system 107 that are in the second subset or may query another system to obtain the options. For example, if the second subset includes component 106, the system configuration application may obtain the configuration options so that the options may be provided to user 141. In some cases, default settings for the options may be used while, in other examples, user 141 may be required to supply one or more of the desired option settings. The second subset may be populated into the process management application one of the manners described above with respect to populating the component sourcing application. Also like the component sourcing application, the system configuration application may be executing on process management system 101 or the component sourcing application may be executing on another computing system in communication with process management system 101, such as a user system operated by user 141. Once populated in the system configuration application, the system configuration application allows the user to provide input defining the configuration options for each component. When process system 107 is installed, the configuration options may be supplied to the components of process system 107 before process system 107 begins operation.

Figure 3:
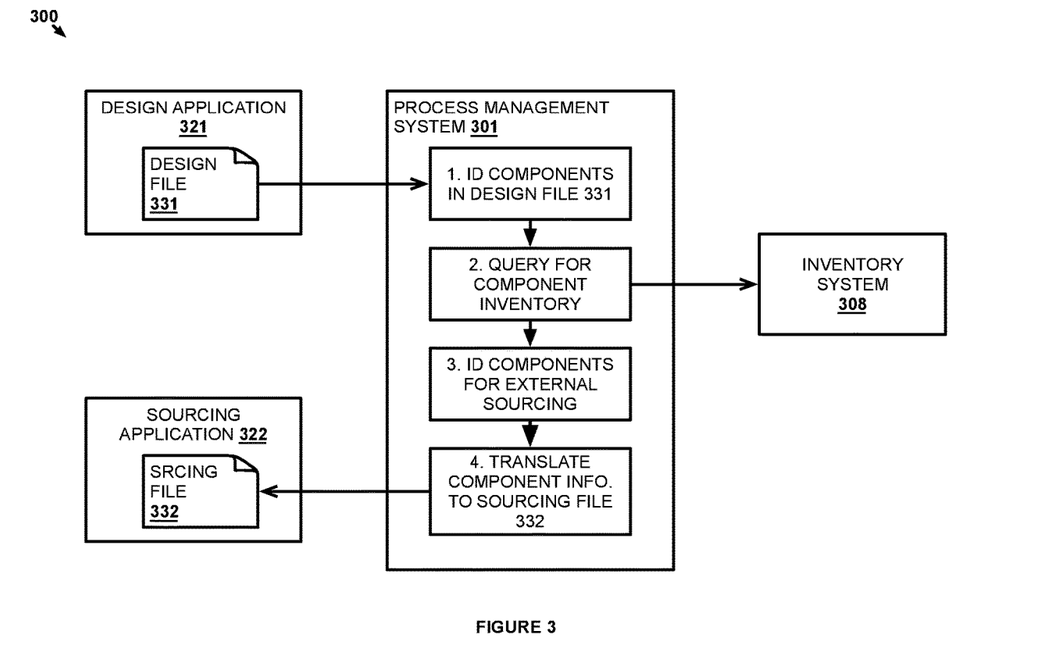
FIG. 3 illustrates an operational scenario for automating component sourcing based on the design of a process system.

FIG. 3 illustrates operational scenario 300 for automating inventory management based on the design of a process system. Operational scenario 300 includes process management system 301, which may be an example of process management system 101. In this example, process management system 301 populates component information into component sourcing application 322 by translating between files used by system design application 321 and component sourcing application 322, respectively. In particular, process management system 301 at step 1 identifies components of a process system that is specified in system design file 331. System design file 331 may be stored on process management system 301, either based on system design file 331 being originally created on process management system 301 (e.g., process management system 301 may be executing system design application 321) or based on process management system 301 receiving system design file 331 in some other manner (e.g., over a communication network from a system executing system design application 321 or from a file storage system). System design file 331 is in a format that is accessible by system design application 321 and process management system 301. Process management system 301 reads the information within system design file 331 to determine which components are specified therein.

After identifying the specified components, process management system 301 queries inventory system 308 at step 2 to determine whether any of the components can be sourced from inventory rather than being sourced from an external provider at step 3. Inventory system 308 provides inventory information about the components from system design file 331 to process management system 301 so that process management system 301 can apply criteria to the inventory information to determine whether any of the components should be sourced from an external provider. As noted above, process management system 301 may consider inventory amounts, component locations, or other type of criteria to determine whether a particular component, even if in inventory, should still be sourced from an external provider.

After identifying components that should be sourced from an external provider, process management system 301 at step 4 translates information identifying those components in system design file 331 to information identifying those components in component sourcing file 332. The translation in this example includes process management system 301 reformatting information identifying the components for external sourcing into component sourcing file 332. Component sourcing file 332 is in a format that is accessible by component sourcing application 322 and process management system 301. In addition to the format of system design file 331 and component sourcing file 332 being different, the information therein may need to be expressed differently. For instance, system design file 331 may require component part number and manufacturer information, if so included, to be in a different order than in component sourcing file 332. In another example, two of the same components may be represented individually in system design file 331 but merely need to be identified as being two of a particular component in component sourcing file 332. More complex translations may also be performed. In some examples, process management system 301 may create component sourcing file 332 before populating information into component sourcing file 332. In other examples, component sourcing application 322 may create component sourcing file 332 before process management system 301 accesses component sourcing file 332 to populate the component information therein. The component information may identify a particular component and identify how many of the components should be sourced from an external provider. Once the component information is populated into component sourcing file 332, component sourcing application 322 is able to access component sourcing file 332 to perform various sourcing related functions based on the components identified therein (e.g., identify a supplier with the lowest cost for a particular component). Like system design application 321, component sourcing application 322 may be executing on process management system 301 or may be executing on some other system with access to component sourcing file 332.

Figure 4:
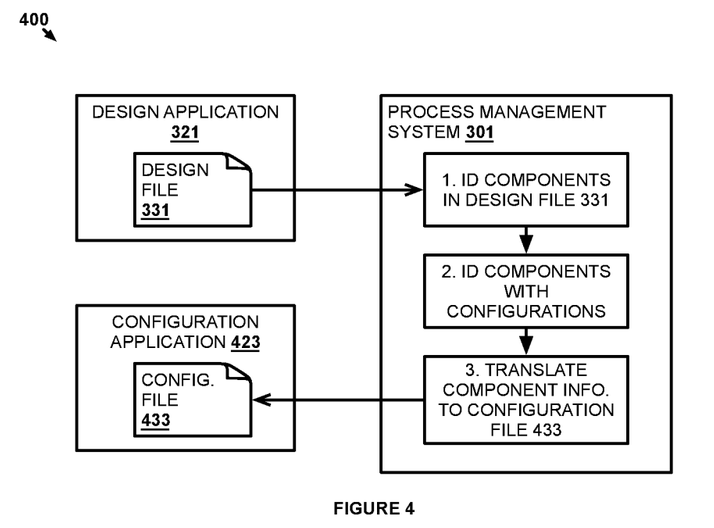
FIG. 4 illustrates an operational scenario for automating component sourcing based on the design of a process system.

FIG. 4 illustrates operational scenario 400 for automating inventory management based on the design of a process system. Operational scenario 400 may occur independently of operational scenario 300 or may occur along with operational scenario 300. Like in operational scenario 300, in operational scenario 400, process management system 301 at step 1 identifies components of a process system that is specified in system design file 331. Since step 1 is the same for both operational scenario 300 and operational scenario 400, step 1 may only need to be performed once if both operational scenario 300 and operational scenario 400 occur.

After identifying the components of the process system, process management system 301 identifies components for which configuration options can be set using system configuration application 423 at step 2. Process management system 301 may query system configuration application 423, query one or more of the components (i.e., if they are already operating in some capacity within the industrial environment and in communication with process management system 301), query a manufacturer system operated by a manufacturer of one or more components, or otherwise obtain information that indicates which components system configuration application 423 is capable of configuring.

Regardless of how the components identified, process management system 301 at step 3 translates information identifying those components in system design file 331 to information identifying those components in configuration file 433. The translation in this example includes process management system 301 reformatting information identifying the components for system configuration application 423 into configuration file 433. Configuration file 433 is in a format that is accessible by system configuration application 423 and process management system 301. In addition to the format of system design file 331 and configuration file 433 being different, the information therein may need to be expressed differently. In some examples, process management system 301 may create configuration file 433 before populating information into configuration file 433. In other examples, system configuration application 423 may create configuration file 433 before process management system 301 accesses configuration file 433 to populate the component information therein. The component information may identify a particular component and may provide additional context about the component with respect to the process system design specified in system design file 331. Once the component information is populated into configuration file 433, system configuration application 423 is able to access configuration file 433 to perform functions that allow a user to configure the options for the components identified therein. Like system design application 321, system configuration application 423 may be executing on process management system 301 or may be executing on some other system with access to configuration file 433.

Figure 5:
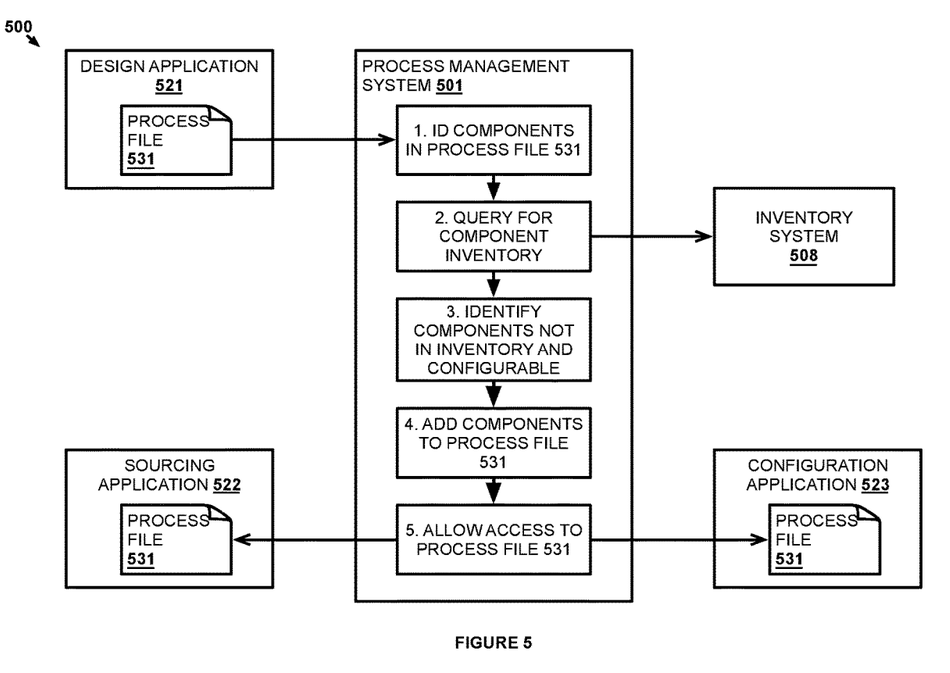
FIG. 5 illustrates an operational scenario for automating component sourcing based on the design of a process system.

FIG. 5 illustrates operational scenario 500 for automating inventory management based on the design of a process system. In operational scenario 500, process management system 501 defines a common file format that is accessible by system design application 521, component sourcing application 522, and system configuration application 523. Process system file 531 is an example of a file in the common file format. The common file format is defined such that process system file 531 may include any type of information that system design application 521, component sourcing application 522, and system configuration application 523 would require in their own proprietary file formats. Each of system design application 521, component sourcing application 522, and system configuration application 523 may be configured to access process system file 531 directly or process management system 501 may translate the information in process system file 531 such that the information appears to be stored in a respective file format that can be accessed by system design application 521, component sourcing application 522, and system configuration application 523 (e.g., each application's own proprietary file format).

Operational scenario 500 begins similarly to operational scenario 300 and operational scenario 400, with process management system 501 identifying at step 1 components specified for a process system design using system design application 521. The specifications for the process system are stored in process system file 531 that process management system 301 reads to identify the components in the process system. Process management system 301 then queries inventory system 508 at step 2 for inventory information about the specified components. From the inventory information, process management system 301 identifies at step 3 a first subset of the specified components that are not available for sourcing from inventory and a second subset of the components that are subject to the configuration capabilities of system configuration application 523. In some examples, component sourcing application 522 and system configuration application 523 may themselves perform the identification of their respective subsets by accessing the design specifications from process system file 531.

Information about the components is added to process system file 531 at step 4. In this example, since the components themselves are already defined in process system file 531 as part of the process system design specification, process management system 501 may simply indicate in process system file 531 (e.g., set respective flags) which of the components in the design specification are applicable to component sourcing application 522 and/or system configuration application 523. Alternatively, process management system 501 may store information about the respective subsets in different portions of system design file 331. Other manners of storing information in process system file 531 may also be used. Process management system 501 allows component sourcing application 522 and system configuration application 523 at step 5 to access process system file 531 for performing component sourcing application 522 and system configuration application 523's respective functions. Component sourcing application 522 and system configuration application 523 may modify the information in process system file 531. For example, if component sourcing application 522 orders the subset of the components that were identified as needing to be sourced from an external provider, then component sourcing application 522 may update information in component sourcing application 522 indicating that the subset of the components have been ordered along with other useful information, such as an order confirmation number for each component. Similarly, system configuration application 523 may store the configurable options selected by a user in process system file 531 so that they can be referenced later. As noted above, the information stored in process system file 531 by component sourcing application 522 and system configuration application 523 may be any information that component sourcing application 522 and system configuration application 523 would store in respective proprietary files, although the information may be stored in a different manner within process system file 531.

Since system design application 521, component sourcing application 522, and system configuration application 523 all have access to process system file 531, changes made to process system file 531 may affect the other applications when they access process system file 531. For example, adding a component to the design specification using system design application 521 may result in another component needing to be sourced using component sourcing application 522 and/or another component to be configured using system configuration application 523.

Figure 6:
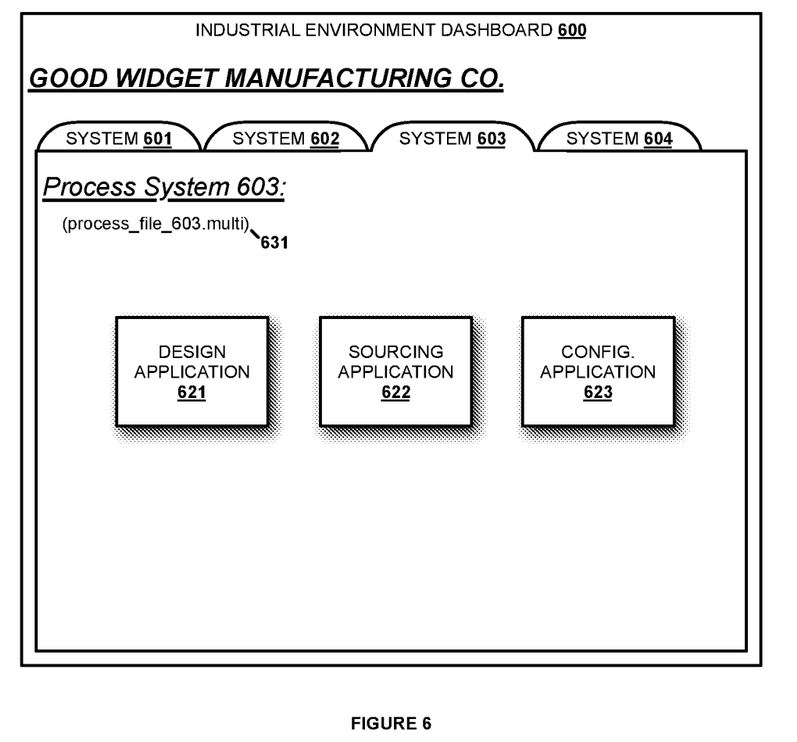
FIG. 6 illustrates an industrial environment dashboard for automating component sourcing based on the design of a process system.

FIG. 6 illustrates industrial environment dashboard 600 for automating inventory management based on the design of a process system. Industrial environment dashboard 600 may be presented as a graphical user interface into a system management software platform that executes on a process management system to perform in accordance with the examples above. Industrial environment dashboard 600 is associated with the example Good Widget Manufacturing Company and may, therefore, be operated by an employee thereof or contractor thereto. In this example, industrial environment dashboard 600 displays a tab corresponding to process system 601, a tab corresponding to process system 602, a tab corresponding to process system 603, and a tab corresponding to process system 604. The tab corresponding to process system 603 is currently selected and that tab's contents are shown in the foreground of the view presented by industrial environment dashboard 600. Specifically, buttons allowing a user to launch system design application 621, component sourcing application 622, and system configuration application 623 are displayed in the foreground of industrial environment dashboard 600.

In this example, a common file format like that used in operational scenario 500 is used by system design application 621, component sourcing application 622, and system configuration application 623 when launched from their respective buttons in the tab corresponding to process system 603. Specifically, process system file 631 is accessed by system design application 621, component sourcing application 622, and system configuration application 623 to perform their various functions with respect to process system 603. If the user were to select one of the other tabs, such as the tab corresponding to process system 601, then the user may be presented with similar buttons to launch system design application 621, component sourcing application 622, and system configuration application 623 to access information in a process file for process system 601 instead of process system file 631.

It should be understood that industrial environment dashboard 600 is only one example of a user interface into the process management systems described above. In some examples, industrial environment dashboard 600 may be part of an overarching software platform for managing process systems in an industrial environment. In some examples, the software may be displayed by a user interface of the process management system or by a user interface of a user system in communication with the process management system. In the latter example, the user system may display industrial environment dashboard 600 as part of a web browser-based interface (e.g., website or web app) to the process management system, as part of a user interface for an application executing on the user system that communicates with the process management system, or displayed in some other manner.

Figure 7:
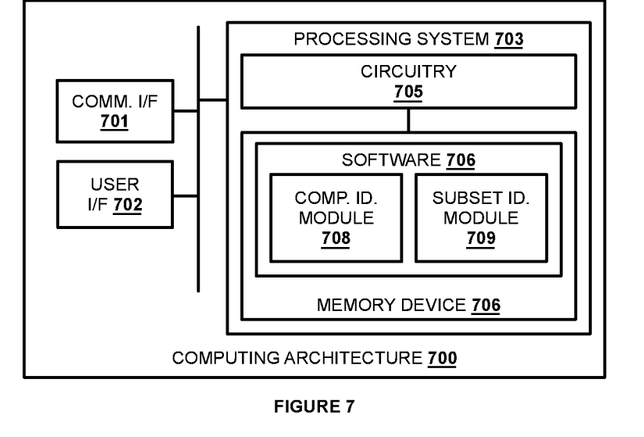
FIG. 7 illustrates an example computing architecture for automating component sourcing based on the design of a process system.

FIG. 7 illustrates computing architecture 700 for automating inventory management based on the design of a process system. Computing architecture 700 is representative of any computing system or systems with which the various operational architectures, processes, scenarios, and sequences disclosed herein may be implemented. Computing architecture 700 is an example computing architecture for process management system 101, process management system 301, and process management system 501, although alternative configurations may also be used. Computing architecture 700 comprises communication interface 701, user interface 702, and processing system 703. Processing system 703 is linked to communication interface 701 and user interface 702. Processing system 703 includes processing circuitry 705 and memory device 706 that stores operating software 707.

Communication interface 701 comprises components that communicate over communication links, such as network cards, ports, RF transceivers, processing circuitry and software, or some other communication devices. Communication interface 701 may be configured to communicate over metallic, wireless, or optical links. Communication interface 701 may be configured to use TDM, IP, Ethernet, optical networking, wireless protocols, communication signaling, or some other communication format—including combinations thereof.

User interface 702 comprises components that interact with a user. User interface 702 may include a keyboard, display screen, mouse, touch pad, or some other user input/output apparatus. User interface 702 may be omitted in some examples.

Processing circuitry 705 comprises processing circuitry, such as a microprocessor, and other circuitry that retrieves and executes operating software 707 from memory device 706. Memory device 706 comprises one or more computer readable storage media, such as a disk drive, flash drive, data storage circuitry, or some other memory apparatus that in no cases should be considered a mere propagated signal. Operating software 707 comprises computer programs, firmware, or some other form of machine-readable processing instructions. Operating software 707 includes component identification module 708 and subset identification module 709. Operating software 707 may further include an operating system, utilities, drivers, network interfaces, applications, or some other type of software. When executed by circuitry 705, operating software 707 directs processing system 703 to operate computing architecture 700 as described herein.

In particular, component identification module 708 directs processing system 703 to receive design specifications of the process system via a system design application and determine components to implement the process system from the design specifications. Subset identification model 709 directs processing system 703 to identify a first subset of the components for sourcing from an external provider and populate the first subset into a component sourcing application.

The descriptions and figures included herein depict specific implementations of the claimed invention(s). For the purpose of teaching inventive principles, some conventional aspects have been simplified or omitted. In addition, some variations from these implementations may be appreciated that fall within the scope of the invention. It may also be appreciated that the features described above can be combined in various ways to form multiple implementations. As a result, the invention is not limited to the specific implementations described above, but only by the claims and their equivalents.

What is claimed is:

1. A computer-implemented method for automating inventory management, the method comprising:
receiving design specifications of a process system in an industrial environment via a system design application;
determining components to implement the process system from the design specifications;
identifying a subset of the components that comprise components with configurable options to achieve a desired output of the process system;
generating a configuration file, the generating the configuration file comprising translating information identifying the subset of the components from a first format of the design specifications to a second format used by a configuration application; and
providing the configuration file to the configuration application.

2. The computer-implemented method of claim 1, further comprising:
presenting, via the configuration application, a dashboard view associated with the process system, wherein the dashboard view presents the configurable options of the subset of components.

3. The computer-implemented method of claim 2, further comprising:
receiving, via the configuration application, one or more configuration selections for the configurable options of the subset of components.

4. The computer-implemented method of claim 3, further comprising:
providing, after installation of the process system, each of the one or more configuration selections to a corresponding component in the subset of components.

5. The computer-implemented method of claim 1, wherein:
each component in the subset of components comprises computing circuitry that controls a physical operation of at least a portion of the process system; and
the computing circuitry uses configuration options from the configuration file.

6. The method of claim 1, wherein the identifying the subset of the components comprises querying one of the configuration application, the components, a manufacturer system, or a combination thereof.

7. The method of claim 1, wherein the translating comprises adding context about one or more of the subset of the components with respect to the process system to the configuration file.

8. A system for automating inventory management, comprising:
one or more processors; and
one or more memory having stored thereon instructions that, upon execution by the one or more processors, cause the one or more processors to:
receive design specifications of a process system in an industrial environment via a system design application;
determine components to implement the process system from the design specifications;
identify a subset of the components that comprise components with configurable options to achieve a desired output of the process system;
generate a configuration file, the generating the configuration file comprising translating information identifying the subset of the components from a first format of the design specifications to a second format used by a configuration application; and
provide the configuration file to the configuration application.

9. The system of claim 8, wherein the instructions comprise further instructions that, upon execution by the one or more processors, cause the one or more processors to:
present, via the configuration application, a dashboard view associated with the process system, wherein the dashboard view presents the configurable options of the subset of components.

10. The system of claim 9, wherein the instructions comprise further instructions that, upon execution by the one or more processors, cause the one or more processors to:
receive, via the configuration application, one or more configuration selections for the configurable options of the subset of components.

11. The system of claim 10, wherein the instructions comprise further instructions that, upon execution by the one or more processors, cause the one or more processors to:
provide, after installation of the process system, each of the one or more configuration selections to a corresponding component in the subset of components.

12. The system of claim 8, wherein:
each component in the subset of components comprises computing circuitry that controls a physical operation of at least a portion of the process system; and
the computing circuitry uses configuration options from the configuration file.

13. The system of claim 8, wherein the instructions to identify the subset of the components comprises further instructions that, upon execution by the one or more processors, cause the one or more processors to:
query at least one of the configuration application, the components, a manufacturer system, or a combination thereof.

14. The system of claim 8, wherein the instructions to translate comprises further instructions that, upon execution by the one or more processors, cause the one or more processors to:
add context about one or more of the subset of the components with respect to the process system to the configuration file.

15. A computer-readable storage media device having program instructions stored thereon to facilitate inventory management automation, wherein the program instructions, upon execution by one or more processors, cause the one or more processors to:
receive design specifications of a process system in an industrial environment via a system design application;
determine components to implement the process system from the design specifications;
identify a subset of the components that comprise components with configurable options to achieve a desired output of the process system;
generate a configuration file, the generating the configuration file comprising translating information identifying the subset of the components from a first format of the design specifications to a second format used by a configuration application; and
provide the configuration file to the configuration application.

16. The one or more computer-readable storage media of claim 15, wherein the program instructions comprise further instructions that, when executed by the one or more processors, cause the one or more processors to:
present, via the configuration application, a dashboard view associated with the process system, wherein the dashboard view presents the configurable options of the subset of components.

17. The one or more computer-readable storage media of claim 16, wherein the program instructions comprise further instructions that, when executed by the one or more processors, cause the one or more processors to:
receive, via the configuration application, one or more configuration selections for the configurable options of the subset of components.

18. The one or more computer-readable storage media of claim 17, wherein the program instructions comprise further instructions that, when executed by the one or more processors, cause the one or more processors to:
provide, after installation of the process system, each if the one or more configuration selections to a corresponding component in the subset of components.

19. The one or more computer-readable storage media of claim 15, wherein:
each component in the subset of components comprises computing circuitry that controls a physical operation of at least a portion of the process system; and
the computing circuitry uses configuration options from the configuration file.

20. The one or more computer-readable storage media of claim 15, wherein the instructions to identify the subset of the components comprises further instructions that, upon execution by the one or more processors, cause the one or more processors to:
query at least one of the configuration application, the components, a manufacturer system, or a combination thereof.

* * * * *